Jan. 31, 1961    F. L. FISCHER    2,969,675
ALTIMETER
Filed April 12, 1957    3 Sheets-Sheet 2
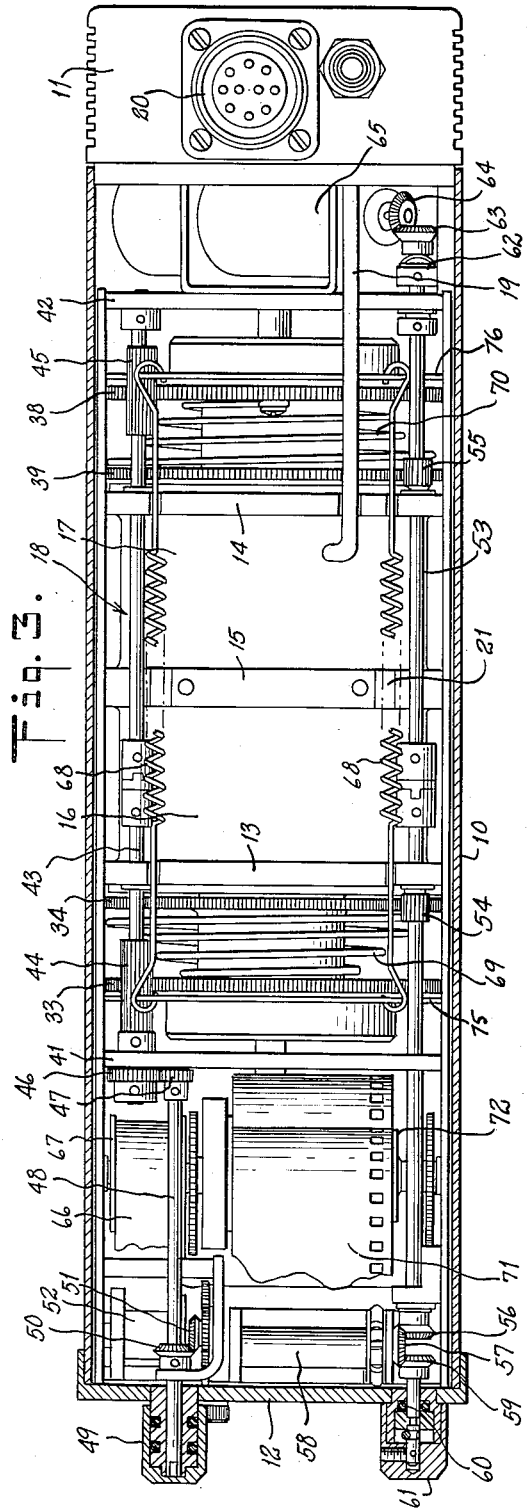
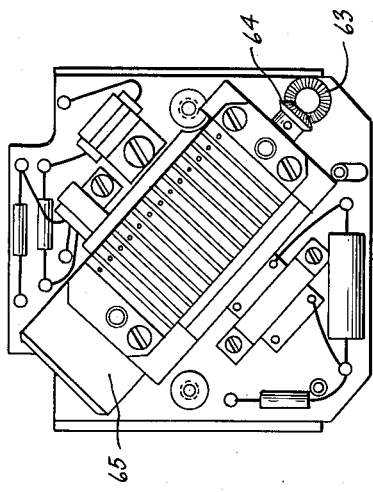
INVENTOR.
Franz L. Fischer
BY
Kenyon & Kenyon
ATTORNEYS Jan. 31, 1961   F. L. FISCHER   2,969,675
ALTIMETER Filed April 12, 1957   3 Sheets-Sheet 3

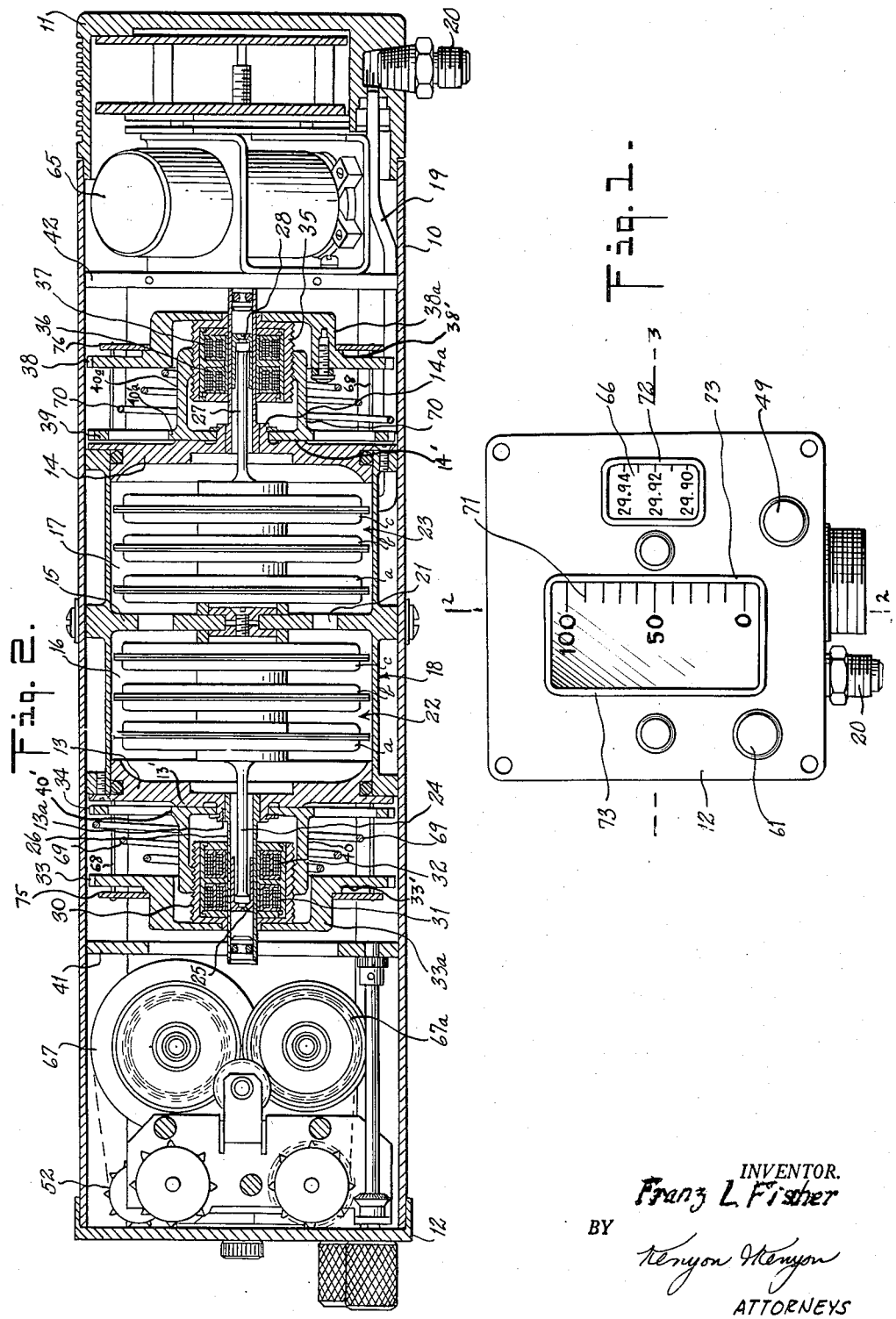

INVENTOR.
Franz L. Fischer
BY
Kenyon & Kenyon
ATTORNEYS

United States Patent Office 2,969,675
Patented Jan. 31, 1961

2,969,675

ALTIMETER

Franz L. Fischer, Jackson Heights, N.Y., assignor to Bulova Research and Development Laboratories, Inc., Woodside, N.Y., a corporation of New York Filed Apr. 12, 1957, Ser. No. 652,592

2 Claims. (Cl. 73—386)

The present invention relates generally to pressure-sensitive instruments and more particularly to aircraft altimeters of the aneroid type. The invention constitutes an improvement over prior art devices as well as over the altimeter structure disclosed and claimed in the copending application of Frederick C. Melchior entitled "Automatic Indicating and Control Instrument," filed December 3, 1956, Ser. No. 625,711.

The basic elements of an altimeter of the aneroid type are an actuating mechanism in the form of one or more pressure-sensitive capsules, the movement of the expansible capsules being amplified by a transmission device and applied to a suitable indicator. Ideally, an altimeter will respond instantly and accurately to changes in ambient pressure, however minute, thereby affording precise readings of altitude. But altimeters of standard design are subject to several limitations which materially impair their sensitivity and give rise to spurious readings.

An accurate and reliable altimeter is of the utmost importance in airborne installations, particularly in flight over difficult terrain where even small errors in altimeter readings may prove very costly. Conventional instruments are deficient in this regard, for their sensitivity is affected adversely by friction and lag effects in the transmission device. Moreover, the accuracy of existing altimeters is disturbed by variations in ambient temperature as well as acceleration and gravitational forces encountered in aircraft operation.

In view of the foregoing, it is the principal object of the present invention to provide an altimeter of exceptional sensitivity which gives instantaneous and accurate readings over the entire operating range. An instrument in accordance with the invention significantly improves the safety factor in aircraft operation and is particularly valuable for close traffic control.

More specifically, it is an object of the invention to provide an altimeter in which the movements of the pressure-sensitive capsule element are transferred electrically to an indicating system, thereby freeing the sensing element from mechanical work. The consequent elimination of friction produces a sensitivity of a high order and permits the capsules to develop their inherent accuracy to the fullest extent.

Also an object of the invention is to provide an altitude-measuring instrument adapted to operate as a control for an autopilot and having a characteristic sensitivity of such order as to produce an active re-positioning response to minute variation in altitude, thereby precluding "hunting" effects.

A further object of the invention is to provide an altimeter constituted by a pair of pressure-sensitive systems in symmetrically balanced relationship, the altimeter being rendered substantially immune to accelerating and gravitational forces.

A salient feature of the invention resides in an adjustable zero-setting mechanism to effect compensation for variations in extraneous factors, such as sea-level barometric pressures, whereby absolute values of altitude are directly available for observation and control. The adjustable mechanism lends itself readily to remote control from a ground-transmitting station, thus relieving the pilot from the need to make corrections before taking an altitude reading.

It is yet another object of the invention to provide an altimeter structure in which electrical network values are changed as a function of the movement of the sensing elements and in which values are restored automatically to a null condition by a follow-up servo system. Another significant feature of the invention lies in the fact that the servo system acts substantially without lag, whereby the speed of the servo motor becomes a true and instantaneous expression of the rate of change in air pressure. This rate of change may be directly indicated or utilized to carry out control functions.

Still another object of this invention is to provide an altimeter in which the pressure-sensitive capsules are contained in a sealed chamber which may be exposed to ambient air, thereby eliminating the need hermetically to seal the entire instrument. The invention is further characterized by a simple, sturdy and compact mechanical design which minimizes space requirements in aircraft installations.

Briefly stated, in an altimeter in accordance with the invention, a pair of pressure-sensitive capsule elements are suspended in axial alignment, the elements being disposed symmetrically in opposing relationship to form a balanced system. Projecting axially from the capsule elements are rods terminating in cores of magnetic material, the cores being reciprocable within respective annular inductive devices constituted by a pair of transformers whose secondaries are arranged in a control circuit. The control circuit generates an output voltage whose amplitude and phase depend on the axial position of the core relative to the two transformers, a null being obtained when the core is axially centered with respect thereto. Inasmuch as the cores move in opposing directions in response to a given change in pressure, the output voltages, which are similarly opposed, are applied to a servo amplifier to produce a control voltage reflecting the slightest change in pressure.

The control voltage is applied to a servo motor coupled mechanically to the two inductive devices to displace same in opposing directions to corresponding points at which the respective cores are again centered and a null condition restored. The servo motor is coupled to a continuous scale calibrated to indicate altitude. Separate control means are provided to set the initial axial positions of the devices relative to their cores to correct for variations in sea-level pressure.

For a better understanding of the invention, as well as other objects and further features thereof, reference is had to the following detailed description to be read in conjunction with the accompanying drawing, wherein like components in the several views are identified by like reference numerals.

In the drawings:

Fig. 1 is a face view showing the operating panel of an instrument in accordance with the invention;

Fig. 2 is a longitudinal section of the instrument taken along the plane indicated by the line 2—2 in Fig. 1;

Fig. 3 is another longitudinal section taken along the plane indicated by line 3—3 in Fig. 1;

Fig. 4 is a rear view of the instrument with the rear cover removed;

Figure 5:
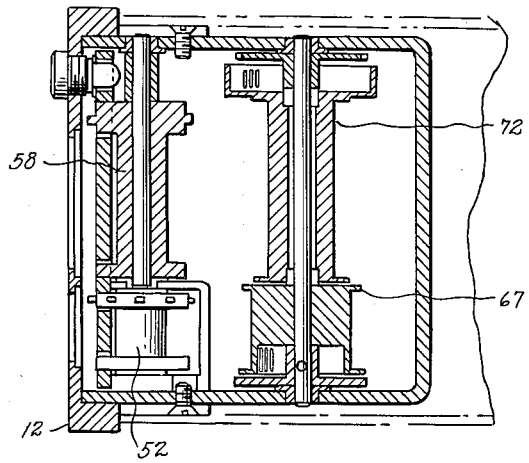
Fig. 5 shows the components and structure of the scale assembly at the front end of the instrument.

Referring now to the drawings, an instrument in accordance with the invention is housed within an elongated casing 10 having a generally rectangular cross-sectional area, the rear end of the casing being enclosed by a cover 11 and the front end by a face plate 12. Positioned centrally in the casing is a gas-tight cylindrical chamber 18 hermetically sealed at either end by discs 13 and 14 and divided by a partition 15 into two like compartments 16 and 17.

The ambient air pressure is transmitted to chamber 18 via a tube 19, one end of which terminates in a pipe coupler 20 projecting laterally from rear cover 11, the inner end communicating with compartment 17. Air holes 21 formed in partition 15 interconnect the compartments, thereby exposing both to ambient air pressure. In practice the instrument may be installed in an aircraft having a pressurized cabin, the sealed chamber 18 being put into communication with the exterior air pressure by means of a suitable pipe coupled to outlet 20. Those components of the instruments which are not in the sealed chamber are subjected to the internal pressure of the aircraft, which generally is maintained at a constant level.

Disposed within compartment 16 is a pressure-sensitive element 22 constituted by a stacked assembly of three capsules 22a, 22b and 22c, which are joined together at their center hubs by means of suitable screws. The hub of the rearmost capsule 22c is fixedly supported on partition 15 to provide a suspension wherein element 22, which expands and contracts in response to ambient pressure variations, is free to reciprocate axially with respect to the front end of the casing. The invention is not limited to a stacked assembly of three capsules. Obviously, the greater the number of capsules forming the stack, the greater the resultant movement in response to a change in pressure.

Similarly disposed within compartment 17 is a pressure-sensitive element 23 constituted by a stacked assembly of three capsules 23a, 23b and 23c which are joined together at their center hubs, the hub of the foremost capsule 23a being fixedly supported on partition 15 to provide a suspension in which element 23 is free to reciprocate axially with respect to the rear of the casing. Thus elements 22 and 23 are symmetrically suspended on opposing sides of a common wall, the movement of the elements in response to a given change being in opposing directions. As will be later evident, the pressure-sensitive elements are unloaded and free to expand and contract.

The capsules are individually evacuated and preferably are of the concentrically corrugated diaphragm type disclosed in the patent to Melchior, No. 2,760,260. By a method of diaphragm forming, heat treatment and cold working, optimum capsule characteristics are obtained. Corrosion-resistant material is preferably used in fabricating the capsules.

The pressure-sensitive elements 22 and 23 are of matched construction, whereby a given increase in altitude as reflected by a decrease in air pressure causes both elements to expand to the same extent, but in opposing directions. Conversely, a drop in altitude results in contraction to the same extent but in reverse directions. Because the masses and spring rates are the same for both capsule groups, this feature eliminates the effects of gravity, acceleration and vibration.

Firmly attached to and projecting axially from the hub of capsule 22a is an armature 24 of non-magnetic material. Affixed to the free end of armature 24 is a soft iron core 25 in the form of a hollow cylinder. The armature and core are movable within a thin wall tube 26 of non-magnetic material. Tube 26 is held at one end within a bushing 13a projecting centrally from the front wall of the chamber and communicates with the compartment 16 in axial registration with the capsules therein, the other end of the tube being hermetically sealed.

Secured to and projecting axially from the hub of capsule 23c is a non-magnetic armature 27 terminating in a soft iron core 28, the armature being reciprocable in a non-magnetic tube 29 mounted within a bushing 14a projecting from the rear wall 13 of the chamber. Tube 29 communicates with compartment 17, the other end of the tube being hermetically sealed.

Slidably mounted on tube 26 and concentric therewith is a cylindrical frame 30 divided into two equal sections containing like inductive devices constituted by annular transformers 31 and 32, each having a primary winding and a secondary winding. Frame 30 is mounted concentrically within a circular well 33a formed in the hub of a spur gear 33, the front end of the frame being secured to the bottom wall of the well. Spur gear 33 is received on tube 26 and is both rotatable and slidable longitudinally thereon.

Rotatably mounted on the bushing 13a is a spur gear 34 to whose hub is attached a circular sleeve 40, the far end portion of the sleeve being internally threaded to engage external threads formed on the exterior surface of frame 30. Thus rotation of spur gear 34 causes the frame 30 and the associated spur gear 33 to move along the tube 26 in an axial direction depending on the direction of rotation.

As will be explained in greater detail in connection with Fig. 6, the annular transformers 31 and 32 are included in a bridge circuit which is in a state of equilibrium only when the slug or core 25 occupies a mid or null position between the two transformers. The transformers are adjustably positioned relative to the core 25 by spur gear 33 so that the core occupies the null position when the sensing element 22 is subjected to barometric pressure at sea-level. This zero condition must, of course, be set in accordance with existing sea-level pressure. Since the instrument is normally subjected to barometric pressures above sea-level, the resultant expansion of sensing element 22 will shift the core 25 axially away from the null position, thereby upsetting the balance of the bridge circuit in a direction reflecting this change. A servo mechanism responsive to the output of the bridge acts through gear 34 to restore the transformers to the null position, the extent to which gear 34 is rotated representing the existing pressure above sea-level. By coupling the gear 34 to a suitable scale, the altitude above sea-level may be indicated.

A similar arrangement is provided for sensing element 23 whereby mechanical and electrical symmetry is established between the two sensing elements and their associated electrical networks to provide a highly sensitive differential action which responds to the minutest change in barometric pressure to afford accurate readings of altitude.

Slidably mounted on tube 29 is a cylindrical frame 35 divided into two equal sections containing like conductive devices constituted by transformer coils 36 and 37, each having a primary and a secondary winding. Frame 35 is mounted concentrically within a circular well 38a formed in the hub of a spur gear 38, the end of the frame being attached to the bottom wall of the well. Spur gear 38 is received on tube 29 and is both rotatable and longitudinally slidable thereon.

Rotatably mounted on the bushing 14a is a spur gear 39 provided at its hub with a circular sleeve 40a whose far end is internally threaded to engage external threads on the exterior of frame 35, whereby rotation of gear 39 causes the frame and its associated spur gear 38 to move along the tube 29 in an axial direction depending on the direction of rotation. The threads on frames 30 and 35 are left- and right-hand threads, respectively, whereby rotation of either set of spur gears 34 and 39 in the same direction effects movement of the drums to the same extent but in opposing direction.

As best seen in Fig. 3, supported in suitable bearings between transverse walls 41 and 42, which are equally spaced from the ends of chamber 18, is a shaft 43 having elongated pinions 44 and 45 keyed thereto, pinion 44 intermeshing with spur gear 33 and pinion 45 intermeshing with spur gear 38. Shaft 43 is mechanically coupled by means of gears 46 and 47 to still another shaft 48 which terminates in a manual knob 49 projecting from the face plate 12 of the instrument. Keyed to shaft 48 is a bevel gear 50 which engages a bevel gear 51 mounted on the shaft of a sprocket wheel 52.

Also supported between transverse walls 41 and 42 and extending therethrough is a propeller shaft 53 having pinions 54 and 55 keyed thereto which engage spur gears 34 and 39, respectively. The front end of shaft 53 terminates in a bevel gear 56 which engages a bevel gear 57 normal thereto, bevel gear 57 driving a sprocket spool 58. Intermeshing with bevel gear 57 is another bevel gear 59 keyed to the end of a stub shaft 60 in axial alignment with shaft 53 and terminating in a manual knob 61 projecting from the front panel 12 of the instrument. Knob 61 includes an internal clutch whereby the knob may be disengaged from shaft 60.

The rear end of propeller shaft 53 is coupled through a friction clutch 62 to a bevel gear 63 which engages bevel gear 64 keyed to the shaft of a geared servo motor 65 housed in the rear compartment of the casing defined by wall 43. In practice the servo motor may have a gear ratio of 100 to 1. The friction clutch 62 has a torque high enough to permit servo motor 65 to propel the entire system without slippage, yet low enough to allow for manual overriding against the inertia load of the geared servo motor, when it is desired to set the instrument for the control of flying altitude.

Sprocket wheel 52 acts to unwind an auxiliary tape scale 66 from a spool 67 rotatably mounted within a front compartment in the casing defined by wall 41, the spool including a spring mechanism to maintain the scale taut. The auxiliary tape is found on a take-up spool 67a (note Fig. 1). In the reverse direction, spool 67 acts as the take-up. Scale 66, as shown in Fig. 1, is calibrated in sea-level barometric values and is exposed to view by a small window 72, the scale position being adjusted by knob 49. Rotation of knob 49 effects rotation of spur gears 33 and 39 to zero-set the inductive devices relative to the cores for existing sea-level barometric conditions. The length of the pinions 44 and 45 which engage spur gears 33 and 39 is such as to maintain engagement throughout the entire range of longitudinal travel of the associated inductive devices.

Obviously once the system is zero-set and the shaft 43 is stationary, it prevents spur gears 33 and 38 with their associated inductive devices from turning, thus permitting servo motor 65 by way of shaft 53 and the spur gears 34 and 39 to displace the spur gears 33 and 38 with their associated inductive devices longitudinally on the non-magnetic tubes 26 and 29 in opposing directions to keep null balance with the magnetic cores 25 and 28.

For proper working of the device, the spur gears 34 and 39 with their threaded extensions or sleeves 40 and 40a, respectively, must be free to rotate, but without freedom of axial movement. To this end, their hubs 40' and 40a' are kept in close contact with the bosses 13' and 14' formed centrally on chamber walls 13 and 14. To maintain this contact, plates 75 and 76 are provided which press on the shoulders 33' and 38', respectively, of the gears 33 and 38 under the influence of tension springs 68. The axial location of gears 34 and 39 is thus assured and at the same time any backlash between the externally threaded frames 30 and 35 and the internally threaded portions of sleeves 40 and 40a is eliminated. The plates 75 and 76 are prevented from rotation, while free to slide and follow gears 33 and 38 by strips fixed longitudinally in the frame 10 and engaging slots cut in said plates.

Helical cables 69 and 70 surrounding the sleeves 40 and 40a serve to connect the rotatable transformer windings to terminals fixed in the instrument.

The rotation of shaft 53 under the control of the servo motor 65 causes rotation of sprocket wheel 58 which acts to unwind a main scale tape 71 from a spool 72 onto a take-up spool (not shown). The scale is suitably calibrated in terms of elevation and, as shown in Fig. 1, is exposed through a window 73. When the spur gears 33 and 18 are turned by way of the knob 49, the external threads on the frames of the inductive devices operating within the internal threads on the sleeves 40 and 40a will reciprocally shift the transformer coils relative to their cores away from a given null position in one direction or another along the longitudinal axis, this generating differential voltages in the associated control circuit. The control circuit acts upon the servo motor 65 to cause it to move the transformer coils and the scale linked thereto in a direction and extent re-establishing the zero condition.

The auxiliary and main scale tapes may be formed by motion picture film stock having perforations which are engageable with the teeth on the sprocket spools. The scale arrangement may be identical with that disclosed in U.S. Patent 2,603,728, issued July 15, 1952, and U.S. Patent 2,656,721, issued October 27, 1953.

Figure 6:
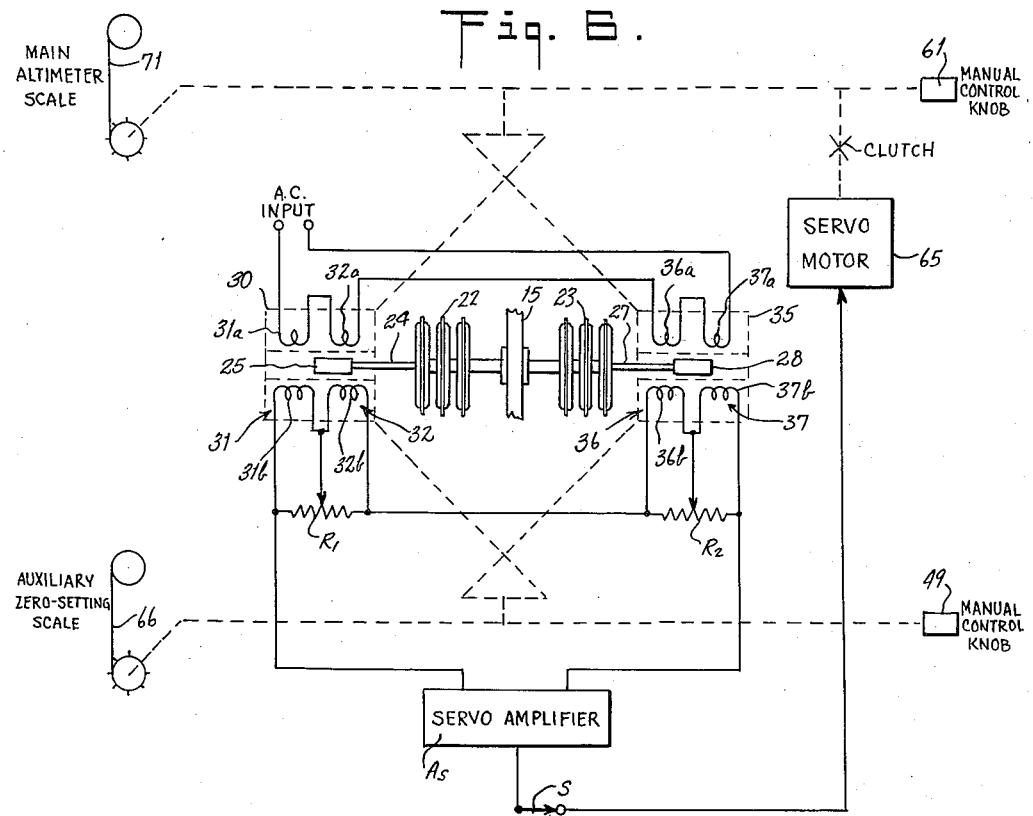
Fig. 6 is a schematic diagram of the electrical control and servo system of the instrument.

Referring now to Fig. 6, which schematically illustrates the altimeter structure and the associated electrical circuits, it will be seen that the pressure-sensitive capsule assemblies 22 and 23 are suspended on common wall 15 and act to shift the axial positions of magnetic cores 25 and 28 relative to their associated transformers.

Transformers 31, 32, 36 and 37 are provided with primary windings 31a, 32a, 36a and 37a, and secondary windings 31b, 32b, 36b and 37b, respectively. All of the primary windings are serially connected to a common source of alternating current, which in aircraft installations usually is a 400 cycle supply. Maximum voltage is induced in a secondary winding of a given transformer when the associated core is fully inserted therein to provide a high permeability path between the primary and secondary. However, when the core is fully inserted in one transformer, it is entirely withdrawn from the other transformer of the pair and the voltage induced in the latter is at minimum value. When core 25 occupies a mid-position between transformers 31 and 32, the voltages induced in secondaries 31b and 32b are exactly equal and when the core is displaced from mid-position, the voltages have relative magnitudes depending on the direction and extent of the displacement. The same conditions apply to the voltages induced in secondary windings 36b and 37b.

The secondaries 31b, 32b, 36b and 37b are connected in series as a control circuit to the input of servo amplifier $A_s$. Connected across secondaries 31b and 32b is a balancing potentiometer $R_1$ whose tap is connected to the junction of the secondaries. Similarly connected across secondaries 36b and 37b is a balancing potentiometer $R_2$. When the core 25 is in mid-position relative to the transformers 31 and 32 and the core 28 is in mid-position relative to transformers 36 and 37, equal and opposite voltages are applied to the control circuit, which voltages balance out to produce a null indication.

In order that the core mid-position be established at zero altitude, it is essential to zero-set the transformer positions for given sea level barometric conditions. This is accomplished by turning knob 49, which acts in the manner previously described, to displace both the frame 30 which carries transformers 31 and 32, and the frame 35 which carries transformers 36 and 37, the frames being displaced in opposing directions. At the same time, auxiliary scale 66 is controlled to indicate the setting.

At altitudes above zero, the cores 25 and 28 depart in opposing directions from their null positions, thereby upsetting the balance of voltages in the control circuit to produce an output voltage which is applied to servo amplifier $A_s$. The output of the amplifier is fed to servo motor 65 which acts to displace frames 30 and 35 in opposing directions until the transformers are restored to their null position; at which point the control circuit output is again zero. The altimeter scale 71 is also operated by the servo motor 65 to indicate the altitude.

If the altimeter is desired to function to control external systems such as an autopilot, the control knob 61 may be used to adjust the scale 71 and the transformer frames to a desired position, and the output of the servo amplifier may be fed through selector switch S to the external system, rather than to the servo motor.

In lieu of manual setting of the altimeter to correct for sea level barometric changes, this may be effected automatically by the use of a telemetering system as shown in Fig. 1, coupled to the knob 49 and responsive to appropriate signals transmitted from a ground radio station. The ground station may take the form of an automatic glide path landing system which radiates a signal pattern to direct the plane onto a landing field, which signal may be made to carry a component for zero-setting the altimeter.

While there has been shown what at present is considered to be a preferred embodiment of the invention, it is to be understood that many changes and modifications may be made therein without departing from the essential spirit of the invention. It is intended therefore in the appended claims to cover all such changes and modifications as fall within the true spirit of the invention.

What is claimed is:

1. An altimeter of the aneroid type comprising a pair of oppositely disposed pressure-sensitive elements provided with axially extending armatures carrying magnetic cores, said elements being arranged in axial symmetry whereby a given change in pressure effects equal and opposite movement of said cores, an inductive device surrounding each armature and constituted by a frame supporting a pair of annular transformers having primary and secondary windings, means connecting the secondaries of the transformers in series to form a control circuit, the primaries of said transformers being connected serially to an alternating voltage source whereby said control circuit produces zero voltage only when the cores occupy corresponding positions relative to the associated transformers, a pair of rotatably mounted spur gears surrounding said armatures and coaxial therewith, a sleeve concentrically disposed about each frame and attached to the hub of the associated spur gear, said sleeve being adapted threadably to engage said frame whereby rotation of said gear effects an axial displacement of said frame relative to said core, and motor means coupled to said control circuit and responsive to the output thereof simultaneously to rotate said spur gears to restore said devices to their mid-positions.

2. An altimeter of the aneroid type comprising a cylindrical pressure chamber divided by a wall into two like compartments, said chamber being enclosed at either end by discs from which project non-magnetic tubes communicating with said compartments, a pair of pressure-sensitive capsule elements suspended symmetrically in said compartments on opposing sides of said wall and being provided with armatures axially extending through said tubes and terminating in magnetic cores, a pair of inductive devices externally slidable on the respective tubes, each device comprising a cylindrical frame supporting a pair of annular transformers having primary and secondary windings, a control circuit constituted by a series connection of the secondaries of said transformers, the primaries of said transformers being connected to an alternating voltage source whereby said control circuit produces zero voltage only when the cores occupy corresponding positions relative to the associated armatures, said control circuit producing an output voltage reflecting a condition of unbalance from said corresponding positions, a pair of spur gears rotatably mounted about said tubes adjacent said end discs, a cylindrical sleeve concentrically disposed about each frame and attached to the hub of the associated spur gear, said sleeve threadably engaging said frame whereby rotation of said gear effects axial displacement of said frame relative to said core, servo means coupled to said control circuit and responsive to the voltage thereof simultaneously to rotate said spur gears in a direction and to an extent restoring zero voltage, and gear means coupled to said frames simultaneously to adjust the initial positions thereof relative to said cores.

References Cited in the file of this patent

UNITED STATES PATENTS

| | | |
|---|---|---|
| 2,627,183 | Greenwood | Feb. 3, 1953 |
| 2,657,350 | Rossire | Oct. 27, 1953 |

FOREIGN PATENTS

| | | |
|---|---|---|
| 258,991 | Great Britain | Oct. 7, 1926 |

OTHER REFERENCES

Aviation Week, article by Henry Lefer, under "Aeronautical Engineering" section, Dec. 5, 1955.